IMPEDANCE MATCHING DEVICE FOR WAVE GUIDE JUNCTIONS

Filed Dec. 15, 1948

INVENTORS
SAMUEL SENSIPER
ROBERT B. MUCHMORE
JOSEPH V. HUPCEY
BY Paul B. Hunter
ATTORNEY Patented Feb. 5, 1952

2,584,162

UNITED STATES PATENT OFFICE 2,584,162

IMPEDANCE MATCHING DEVICE FOR WAVE GUIDE JUNCTIONS

Samuel Sensiper, Cambridge, Mass., Robert B. Muchmore, Los Angeles County, Calif., and Joseph V. Hupcey, Hempstead, N. Y., assignors to The Sperry Corporation, Great Neck, N. Y., a corporation of Delaware Application December 15, 1948, Serial No. 65,362

12 Claims. (Cl. 178—44)

This invention relates to improvements in impedance matching devices for wave guide junctions, and more particularly for junctions of the hybrid tee or so-called "magic tee" type between hollow uniconductor guides. As is well known to those skilled in the art, such junctions include four arms, each comprising a wave guide, intersecting in such manner that two of the arms are collinear, like extensions of one another, and the other two arms are at right angles to each other and to the collinear arms. This structure has balance characteristics like those of a hybrid coil, and is used for analogous purposes at the relatively high frequencies where wave guides find their principal applications.

Owing to the fact that the junction presents an irregularity to the intersecting guides, it will produce reflections therein and set up standing waves, especially in the two non-collinear elements. Accordingly, it is the usual practice to provide reactive elements such as posts, rods, or irises in the wave guides to improve the impedance match of the junction to the different arms. Ordinarily, such reactive elements operate to reduce standing waves effectively only at or near the frequency for which they have been designed. However, it is sometimes desirable to use a junction throughout a relatively wide frequency band without adjustment of the matching devices.

It is the principal object of the present invention to provide improved broad-band impedance matching devices for wave guide junctions.

More specifically, it is an object of this invention to provide improved means for matching the impedances to the so-called series and parallel arms of a hybrid tee junction.

A further object is to provide reactive matching structures whose reactances are more or less distributed, as distinguished from the somewhat lumped reactances presented by irises, rods, and the like, and thus provide effective matching over a wider band than is achieved by prior art practice.

The invention will be described with reference to the accompanying drawings, wherein.

Figure 1:
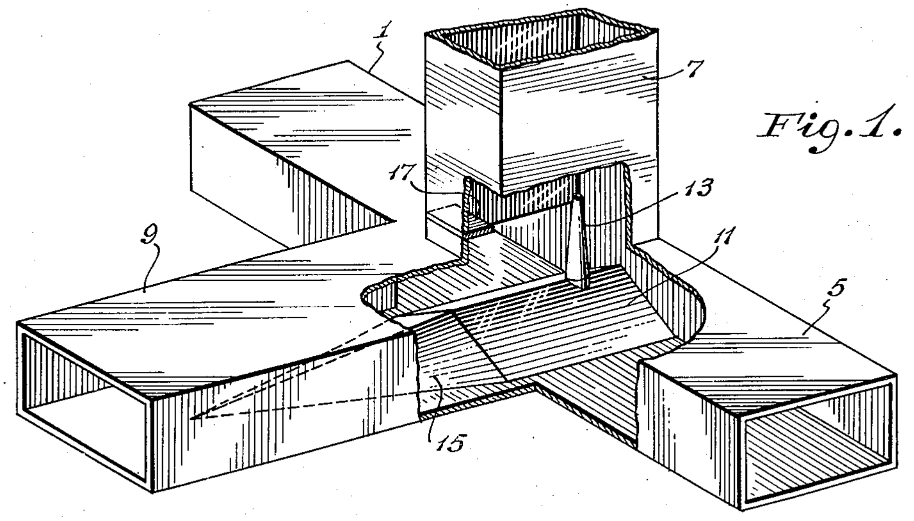
Fig. 1 is a perspective view of a hybrid tee junction, broken to show internal details including impedance matching elements embodying the present invention.

Referring first to Fig. 1, the illustrated hybrid tee junction comprises collinear arms 1 and 5 joined by mutually perpendicular series and parallel arms 7 and 9, respectively. In the present example, each arm is a rectangular wave guide whose transverse dimensions are substantially in the ratio two to one; i. e. the width *a* is twice the height, *b*. While it is to be understood that wave guides of other cross sectional aspect may be used, including those of non-rectangular shapes such as circular or elliptical, it is preferred at present to employ guides of substantially the shape shown in Fig. 1.

In the arrangement of Fig. 1, the wave guides are dimensioned, with respect to the wavelengths with which the system is to operate, so that the only mode which can be excited therein is the $TE_{0,1}$ type, wherein the electric field vector extends between the broad sides of the guide, parallel to the narrow sides. The principal reason for this is to prevent the transmission of undesired higher order modes which may be generated at the junction or at other points in the system.

The described junction has the characteristic that energy supplied through the arm 9 will divide equally, going out the arms 1 and 5 in phase; that is, points on the arms 1 and 5 equally distant from the junction will be excited in phase with each other. Providing the junction is geometrically symmetrical, none of the energy entering by way of the arm 9 will go out the arm 7. Energy applied through the arm 7 will also divide equally between the arms 1 and 5, none going out the arm 9. However, corresponding points on the arms 1 and 5 will be 180 degrees out of phase. Owing to the fact that the arm 7 performs electrically as if it were in series with the arms 1 and 5, it is called a series arm. The arm 9 acts as if it were electrically in parallel with the arms 1 and 5 and is referred to as a parallel or shunt arm.

The above described phenomena occur irrespective of whether or not the various arms are matched to the junction, as long as the impedances presented externally to the collinear arms 1 and 5 are identical. If, in addition, the arms 7 and 9 are matched to the junction and connected to identical impedances at their outer ends, the device has the further characteristic of balance between the arms 1 and 5; energy supplied to the arm 1 divides equally between the series and parallel arms 7 and 9, none going out the arm 5, and energy supplied to the arm 5 also divides between the arms 7 and 9 but none goes out the arm 1.

Since the property of balance for zero coupling between the collinear arms of the hybrid junction is essential or desirable in many practical applications of the device, it is usual to provide irises or posts, or a combination of both, so positioned and designed as to minimize reflections from the junction into the various arms. The matching devices are designed for some selected frequency, and are fully effective at that frequency. At other frequencies, the match becomes imperfect and the standing wave ratio increases rapidly as the frequency is varied from the design center. For example, in a system using inductive irises for matching, the voltage standing wave ratio may rise to about 2 with a change in frequency of less than one percent. Less frequency-sensitive matching arrangements have been devised, using a post for matching the parallel arm and an inductive iris or rod for matching the series arm. These can be made to provide satisfactory matching to the series and parallel arms over a frequency range of about twelve percent.

Figure 2:
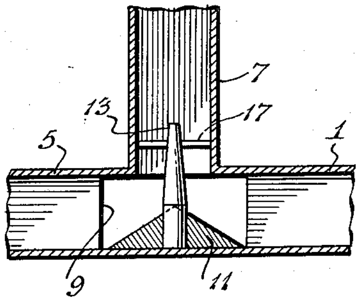
Fig. 2 is a plan sectional view of the device of Fig. 1, taken in a plane immediately above the bottom walls of the collinear and parallel arms of the junction.

According to the present invention, matching throughout a much wider frequency band is attained by using a prismatic body 11 to match the series arm and a conical or tapered post 13 to match the parallel arm. As shown, most clearly in Fig. 4, the body 11 has a cross section in the form of an isosceles triangle whose base is several times its height, and the longitudinal axis of the prism is laterally central of and parallel to the parallel arm 9. At the end of the prism 11 facing the parallel arm 9, a tetrahedral or pyramidal extension 15 is provided (see Figs. 2 and 3) tapering within the arm 9 to an apex at a point whose distance from the junction is about twice the guide width, *a*. The function of the part 15 is to provide a smooth transition from the guide 9 to the junction so that the prism 11 introduces a minimum reflection in the parallel arm 9.

Figure 3:
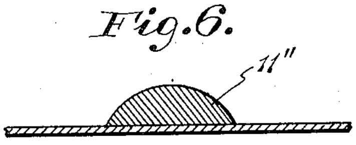
Fig. 3 is an elevation in section of Fig. 2 as viewed in the plane 3—3 of Fig. 2.

The post 13, as shown in Fig. 3, may be in the form of a narrow cone or taper, extending from a point on the apex of the prism 11 about two thirds of the guide width *a* from the mouth of the parallel arm 9, parallel to and into the series arm 7. Tapering the post 13 as shown presents the required reactance across the parallel arm 9 while producing a minimum amount of reflection in the series arm 7.

While the exact explanation of the operation of the described matching system is not known at present, it has been found experimentally that a satisfactory match in all arms of the junction may be obtained throughout a range of the order of four times that covered equally well by prior art devices. The performance can be further improved to some extent by adding an inductive iris 17 in the series arm 7 near the junction, and opposite the end of the post 13.

In designing the matching device to operate over a specified frequency range with guides of standard dimensions, it may be found that the required band width can be obtained, but centered at a frequency below the center of the desired frequency band. This deviation from the desired performance may be corrected by slightly tapering the four arms to somewhat smaller cross sectional dimensions at the junction. Conversely, the band of effective operation may be moved somewhat lower in frequency by reversing the direction of the tapers.

Figure 4:
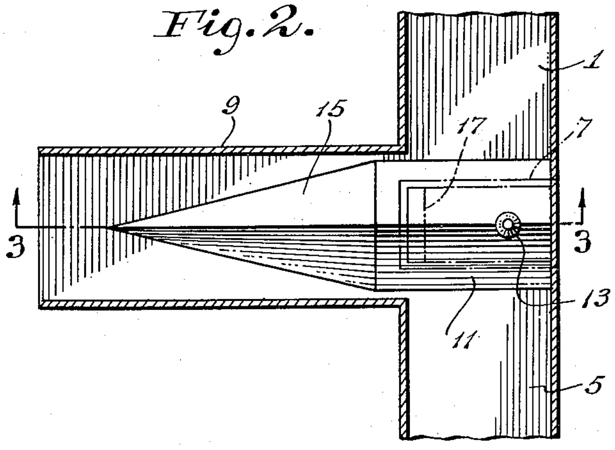
Fig. 4 is a partial section of Fig. 3 in the plane 4—4 of Fig. 3.
Figure 5:
Fig. 5 is a view similar to that of Fig. 4, showing a modification of the structure of Figs. 1 through 4.
Figure 6:
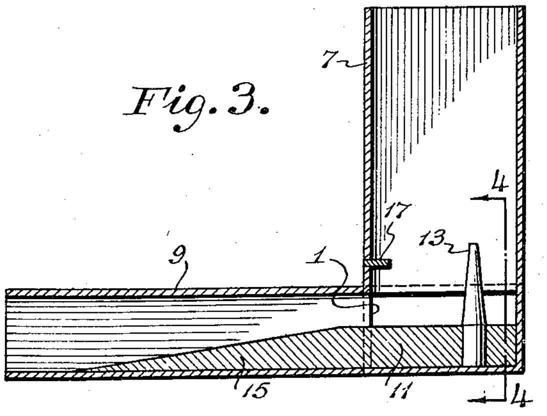
Fig. 6 is a view like that of Fig. 4, but showing a further modification of the invention.

While the prismatic shape of the element 11 shown in Fig. 4 is preferred at present, this preference is based largely on the fact that it is relatively simple to manufacture and can be centered readily in the junction so as not to disturb the balance between the collinear arms. Fig. 5 illustrates in cross section a modified prism or roof shaped body 11', wherein the sides are curved like cylindrical surfaces, concave in the direction of the series arm 7. A further modification is shown in Fig. 6, in which the series arm matching element 1'' is also of cylindrical shape, but convex in the direction of the series arm. A conical post like that shown in Fig. 3 may be used with either of the modifications of Figs. 5 and 6. The terms "prism" or "roof-shaped" as used herein and in the following claims are intended to mean any of the above described shapes, a prism being defined for the purpose of the present description as a three dimensional figure generated by the motion of a plane through space, all points in the plane moving parallel to a common line or directrix.

What is claimed is:

1. In an electromagnetic wave transmission device of the hybrid tee type comprising hollow wave guides joined at a common junction to form two collinear arms, a series arm perpendicular to said collinear arms and a parallel arm perpendicular to said collinear arms and to said series arm, an impedance matching structure including a triangular prism of conductive material lying on one of its sides in said junction at the surface facing said series arm and with its longitudinal axis parallel to said parallel arm, a pyramidal extension at the end of said prism tapering to an apex within said parallel arm, and a conical post on the upper edge of said prism extending into said series arm.

2. In an electromagnetic wave transmission device of the hollow wave guide hybrid tee type comprising two collinear arms, a series arm and a parallel arm with a common junction, an impedance matching structure including a roof-shaped body of conductive material lying in said junction at the surface facing said series arm with its apex toward said series arm and with its longitudinal axis parallel to said parallel arm, a pyramidal extension at the end of said body tapering to an apex within said parallel arm, and a post on the apex of said body extending into said series arm, said post tapering to a minimum cross section at its free end.

3. In an electromagnetic wave transmission device comprising two collinear arms, a series arm and a parallel arm with a common junction, each of said arms comprising a rectangular hollow wave guide whose transverse dimensions are unequal, an impedance matching structure including a prism of conductive material having a cross section in the form of an isosceles triangle whose base is several times its height, said prism lying on its broad side in said junction at the surface facing said series arm and with its longitudinal axis parallel to said parallel arm, a pyramidal extension at the end of said prism tapering to an apex within said parallel arm at a point whose distance from said junction is about twice the width of said guide, a conical post at a point about two-thirds of the guide width from the mouth of said parallel arm on the upper edge of said prism and extending into said series arm, and a capacitive reactance element across said series arm in the vicinity of the end of said post.

4. The invention as set forth in claim 3 wherein said reactance element comprises a conductor extending across said series arm wave guide perpendicular to the smaller cross sectional dimension thereof.

5. In an electromagnetic wave transmission structure including two rectangular wave guides joined end to end and forming collinear arms from their junction, two further wave guides joined at right angles to each other and forming series and parallel arms respectively from said junction, means for matching the impedance of said junction to said series arm including a conductive body of substantially prismatic shape, lying in said junction on the surface opposite said series arm with its longitudinal axis parallel to and laterally central of said parallel arm, and means for matching the impedance of said junction to said parallel arm including a conical post extending from said first mentioned body into said series arm.

6. In an electromagnetic wave guide structure including two wave guides each of rectangular cross section having sides with unequal transverse dimensions, said wave guides being joined at right angles to each other with the long transverse dimension of the first guide parallel to the longitudinal axis of the second guide, an impedance matching device including a conductive body of substantially prismatic shape, having a cross section in the form of an isosceles triangle whose base is substantially greater than its altitude, said body lying in said second guide with its broad side on the surface opposite said first guide and with its longitudinal axis parallel to and laterally central of said second guide.

7. In an electromagnetic wave guide structure including two hollow rectangular wave guides joined end to end and forming collinear arms from their junction, two further wave guides joined at right angles to each other and forming series and parallel arms respectively from said junction, a device for matching the impedance of said junction to said series arm including a roof-shaped conductive body lying in said junction on the surface opposite said series arm with its apex toward said series arm and its longitudinal axis parallel to and laterally central of said parallel arm, and a tetrahedral pyramid merging into said first-mentioned body and extending therefrom with its apex in said parallel arm.

8. The invention as set forth in claim 7 wherein the sides of said roof-shaped body are cylindrical.

9. The invention as set forth in claim 7 wherein the sides of said roof-shaped body are curved concave toward said series arm.

10. In an electromagnetic wave guide structure including a wave guide and two further wave guides joined thereto to form series and parallel arms respectively from their junction, a device for matching the impedance of said junction to said series arm including a roof-shaped conductive body in said junction, said body being of substantially isosceles triangular cross section, with its apex toward said series arm and its longitudinal axis parallel to the longitudinal axis of said parallel arm.

11. In an electromagnetic wave guide structure including a wave guide and two further wave guides joined thereto to form series and parallel arms respectively from their junction, a device for matching the impedance of said junction to said series arm including a roof-shaped conductive body in said junction with an apex toward said series arm and its longitudinal axis parallel to and laterally central of said parallel arm, and a tetrahedral pyramid merging into said first-mentioned body and extending therefrom with its apex in said parallel arm.

12. In an electromagnetic wave guide structure including two wave guides joined at right angles to each other at a junction, a device for matching the impedance of said junction to one of said arms including a conductive body of substantially prismatic shape, said body lying in said junction with an apex extending toward the arm to be matched and with its longitudinal axis parallel to the longitudinal axis of the other of said arms.

SAMUEL SENSIPER.
ROBERT B. MUCHMORE.
JOSEPH V. HUPCEY.

REFERENCES CITED

The following references are of record in the file of this patent:

"Principles of Microwave Circuits" by Montgomery et al., vol. 8, M. I. T. Radiation Lab. Series, pub. by McGraw-Hill, copyright July 6, 1948, first edition (use page 307). (Copy in Div. 69.)